(12) United States Patent
Villoria et al.

(10) Patent No.: US 10,455,280 B2
(45) Date of Patent: *Oct. 22, 2019

(54) SYSTEM AND METHOD FOR DIGITAL MEDIA CONTENT CREATION AND DISTRIBUTION

(71) Applicant: MEDIAPOINTE, INC., Newbury Park, CA (US)

(72) Inventors: Stephen Villoria, Newbury Park, CA (US); Remco Treffkorn, Aptos, CA (US); Kevin Bergner, Fremont, CA (US); James P Block, Long Beach, CA (US)

(73) Assignee: MEDIAPOINTE, INC., Newbury Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,877

(22) Filed: Nov. 8, 2017

(65) Prior Publication Data

US 2018/0091853 A1    Mar. 29, 2018

Related U.S. Application Data

(63) Continuation of application No. 13/917,395, filed on Jun. 13, 2013, now Pat. No. 9,848,236, which is a
(Continued)

(51) Int. Cl.
*H04N 21/442* (2011.01)
*H04N 21/262* (2011.01)
(Continued)

(52) U.S. Cl.
CPC ... *H04N 21/44204* (2013.01); *H04L 12/2838* (2013.01); *H04L 63/0853* (2013.01); *H04L 63/102* (2013.01); *H04L 67/22* (2013.01); *H04N 21/25816* (2013.01); *H04N 21/262* (2013.01); *H04N 21/43615* (2013.01);
(Continued)

(58) Field of Classification Search
CPC ....... H04N 21/44204; H04N 21/25816; H04N 21/262; H04N 21/43615; H04N 21/43622; H04N 21/47202; H04L 12/2838; H04L 63/0853; H04L 63/102; H04L 67/22
See application file for complete search history.

(56) References Cited

U.S. PATENT DOCUMENTS 5,689,442 A * 11/1997 Swanson .......... G08B 13/19647
340/500
5,886,274 A * 3/1999 Jungleib ............... G10H 1/0025
84/601
(Continued)

*Primary Examiner* — Sharon S Lynch
(74) *Attorney, Agent, or Firm* — Meister Seelig & Fein LLP; Seth H. Ostrow

(57) ABSTRACT

A method and system for providing on-site content delivery and on-demand content access. The method comprising recording digital media content on a DMR device, managing distribution of the digital media content to one or more remote devices, automatically distributing the digital media content to the one or more remote devices, the distributed digital media content configured for local hosting at the one or more remote devices, and monitoring consumption of the digital media content distributed to the one or remote devices.

16 Claims, 4 Drawing Sheets

Related U.S. Application Data continuation-in-part of application No. 13/654,399, filed on Oct. 17, 2012, now Pat. No. 9,166,976.

(60) Provisional application No. 61/659,388, filed on Jun. 13, 2012, provisional application No. 61/548,195, filed on Oct. 17, 2011.

(51) Int. Cl.
| | |
|---|---|
| *H04N 21/472* | (2011.01) |
| *H04N 21/258* | (2011.01) |
| *H04L 29/06* | (2006.01) |
| *H04L 29/08* | (2006.01) |
| *H04N 21/436* | (2011.01) |
| *H04L 12/28* | (2006.01) |
| *H04L 12/18* | (2006.01) |

(52) U.S. Cl.
CPC . *H04N 21/43622* (2013.01); *H04N 21/47202* (2013.01); *H04L 12/1822* (2013.01)

(56) References Cited

U.S. PATENT DOCUMENTS

| | | | | |
|---|---|---|---|---|
| 6,598,074 | B1* | 7/2003 | Moller | G10H 1/0058 370/260 |
| 7,124,938 | B1* | 10/2006 | Marsh | G06F 21/10 235/382 |
| 7,319,378 | B1* | 1/2008 | Thompson | B60R 25/102 340/426.1 |
| 7,770,226 | B2* | 8/2010 | Ahn | G06F 21/10 380/201 |
| 8,610,599 | B2* | 12/2013 | Bevacqua | B60R 25/102 340/426.1 |
| 9,809,196 | B1* | 11/2017 | Penilla | H04N 7/181 |
| 2003/0067542 | A1* | 4/2003 | Monroe | H04N 7/181 348/148 |
| 2003/0145211 | A1* | 7/2003 | Fukawa | G06F 21/10 713/182 |
| 2004/0212735 | A1* | 10/2004 | Kitamura | H04N 1/00291 348/553 |
| 2006/0208066 | A1* | 9/2006 | Finn | G06K 7/0004 235/380 |
| 2007/0050298 | A1* | 3/2007 | Givoly | G06Q 20/123 705/52 |
| 2007/0083772 | A1* | 4/2007 | Harada | G06F 21/10 713/193 |
| 2007/0088813 | A1* | 4/2007 | Floyd | H04L 67/104 709/223 |
| 2007/0110012 | A1* | 5/2007 | Abu-Amara | G06F 21/105 370/338 |
| 2007/0203968 | A1* | 8/2007 | Jung | H04L 12/281 709/200 |
| 2008/0082813 | A1* | 4/2008 | Chow | G06F 21/34 713/2 |
| 2008/0113797 | A1* | 5/2008 | Egozy | A63F 13/12 463/35 |
| 2008/0115178 | A1* | 5/2008 | Godin | H04N 7/17318 725/97 |
| 2008/0195546 | A1* | 8/2008 | Lilley | G06F 21/10 705/59 |
| 2008/0204555 | A1* | 8/2008 | Hughes | B60R 25/102 348/148 |
| 2008/0244706 | A1* | 10/2008 | Lenoir | G06F 21/10 726/4 |
| 2009/0070600 | A1* | 3/2009 | Diascorn | G11B 20/00086 713/193 |
| 2009/0144622 | A1* | 6/2009 | Evans | G01C 21/00 715/706 |
| 2009/0209293 | A1* | 8/2009 | Louch | H04M 1/6041 455/566 |
| 2009/0282451 | A1* | 11/2009 | Jensen | G06F 17/30035 725/117 |
| 2009/0313564 | A1* | 12/2009 | Rottler | G11B 27/105 715/764 |
| 2009/0315670 | A1* | 12/2009 | Naressi | G06F 21/10 340/5.8 |
| 2010/0019905 | A1* | 1/2010 | Boddie | G06Q 10/087 340/572.1 |
| 2010/0115145 | A1* | 5/2010 | Banerjee | G06F 9/4413 710/10 |
| 2010/0161997 | A1* | 6/2010 | Lee | H04L 9/32 713/189 |
| 2010/0167648 | A1* | 7/2010 | Doutriaux | G07F 1/06 455/41.2 |
| 2010/0212478 | A1* | 8/2010 | Taub | G10H 1/0058 84/645 |
| 2010/0216549 | A1* | 8/2010 | Salter | G10H 1/0058 463/31 |
| 2010/0296505 | A1* | 11/2010 | Kissinger | G06Q 30/02 370/346 |
| 2011/0125896 | A1* | 5/2011 | Martin Cervera | G06F 17/30035 709/224 |
| 2011/0131340 | A1* | 6/2011 | Steuer | H04H 60/37 709/231 |
| 2011/0131492 | A1* | 6/2011 | Chen | H04N 21/4223 715/716 |
| 2011/0179204 | A1* | 7/2011 | Hulbert | G06F 3/0219 710/74 |
| 2012/0015697 | A1* | 1/2012 | Spencer | H04M 1/605 455/569.1 |
| 2012/0115501 | A1* | 5/2012 | Zheng | H04M 1/72569 455/456.1 |
| 2012/0237908 | A1* | 9/2012 | Fitzgerald | G06F 21/88 434/236 |
| 2012/0278875 | A1* | 11/2012 | Kissinger | G06Q 30/02 726/7 |
| 2013/0060627 | A1* | 3/2013 | Harrison | G06Q 30/00 705/14.39 |
| 2013/0227179 | A1* | 8/2013 | Kalayjian | H04M 1/605 710/36 |
| 2013/0279706 | A1* | 10/2013 | Marti | G06F 3/165 381/57 |
| 2014/0357251 | A1* | 12/2014 | Forutanpour | H04M 1/6008 455/418 |
| 2014/0361902 | A1* | 12/2014 | Carlsson | G08B 21/023 340/686.6 |
| 2015/0201230 | A1* | 7/2015 | Drope | H04N 21/4135 725/88 |

\* cited by examiner

SYSTEM AND METHOD FOR DIGITAL MEDIA CONTENT CREATION AND DISTRIBUTION

CROSS REFERENCE TO RELATED APPLICATION

This application claims the priority of U.S. Provisional Application No. 61/659,338, entitled "SYSTEM AND METHOD FOR DIGITAL MEDIA CONTENT CREATION AND DISTRIBUTION," filed on Jun. 13, 2012, the disclosure of which is hereby incorporated by reference in its entirety.

This application claims the priority of U.S. patent application Ser. No. 13/654,399, entitled "CREATION AND MANAGEMENT OF DIGITAL CONTENT AND WORKFLOW AUTOMATION VIA A PORTABLE IDENTIFICATION KEY," filed on Oct. 17, 2012, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to the delivery, management, and distribution of digital media content for retail store environments. More particularly, the present invention provides a system and method for managing the distribution of digital media for local on-demand playback at one or more retail stores.

BACKGROUND OF THE INVENTION

Retail chain stores can devote significant financial resources and employee time to provide effective training to their employees. The cost of transportation and hotel stays for off-site training added to the cost of hiring instructors, providing material for the participants and losing valuable employee time to travel can lead to excessive costs and lost employee productivity. Additionally, boilerplate training makes it more difficult for businesses to provide regional or localized customization of their promotions and training materials. Every retailer with multiple stores struggles with the cost and logistics of training in store staff, delivering corporate messaging to manage the business culture, and promoting new product offerings to its captive customers. Ever evolving products and a transient workforce presents a great deal of difficulty to grow a business.

Currently, systems do not provide for coordinated digital media distribution to multiple retail-chain sites where they may be repeatedly accessed on-demand. It would be beneficial to retail chains to provide an automated system and method to create digital multimedia content and distribute and manage the content delivery while maintaining a high level of security and controlled access to the content. It would also be beneficial to provide a local play back system accessible to multiple computing devices over a local Wi-Fi network with digital media content transfer from central servers at off peak hours and automated reporting of employee progress in accessing and completing that training.

SUMMARY OF THE INVENTION

The present invention provides methods and systems for automating on-site content delivery and providing on-demand content access. Automation of on-site content delivery includes content management, scheduling, access management to digital content, archiving of digital media content, reporting of content usage, and automatically operating associated systems in a retail chain store environment. The digital media can include content for employee orientation and training, marketing, corporate messaging, and any other content suited for commercial purposes of the retail store (e.g. new menu items for restaurants, sales promotions and customer discounts for durable and non-durable goods, etc.). One embodiment is a method for creating and managing digital media content for delivery from central locations such as corporate headquarters or regional centers, wherein the digital content creation device allows for capturing, recording and streaming media. The created digital media content is transferred to local retail stores for both automatic and on-demand playback using a local digital media player with storage and user access controls.

A wireless local area network can be used by employees to access the content on demand from the local digital media player. Multiple devices can be used to access the content from the local digital media player, including digital signage players, displays with built-in Wi-Fi, smartphones, tablet computer and notebooks. Hierarchical user access control at the local store can be maintained in the local playback devices. The local playback device can also maintain access control of devices by unique identifiers to monitor and control access to the content. Data can be automatically collected and reported from user devices to identify the user and completed tasks, such as, successful completion of employee training sessions.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Figure 1:
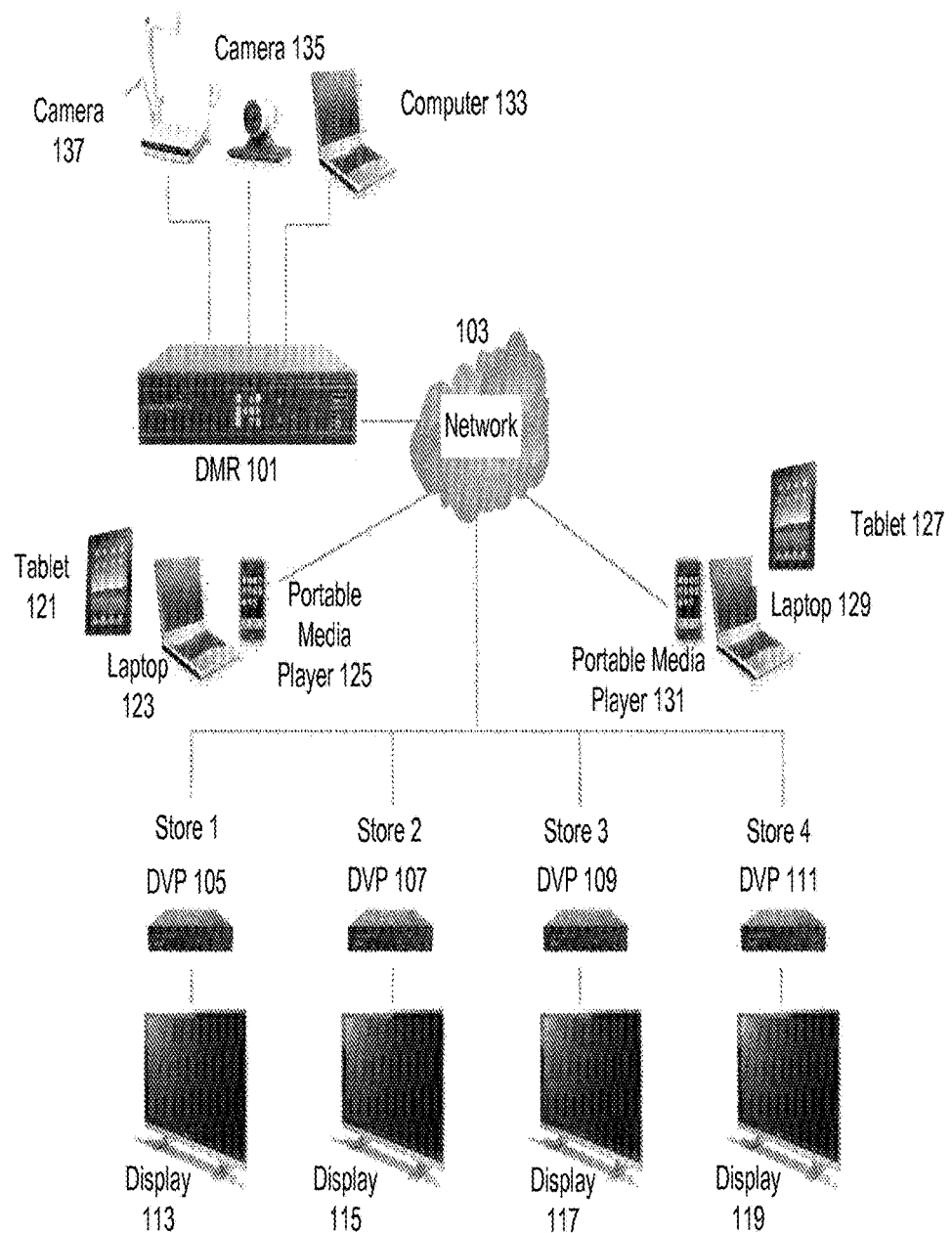
FIG. 1 illustrates a computing system according to an embodiment of the present invention.

FIG. 1 illustrates one embodiment of a system for digital media content distribution that includes a digital media recorder (DMR) device 101, network 103, and digital video players (DVP) 105, 107, 109, 111. DMR 101 and DVP 105, 107, 109, and 111 may be servers, computers, or hardware including one or more central processing units and memory. These devices may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. In other embodiments the DMR 101 may be a passive server or other data storage medium. In one embodiment, DMR 101 may be a content or content creation server used at corporate headquarter locations for digital content creation and/or recording. Digital content may be created using computer 133, high definition camera 135, and document camera 137, which are coupled to DMR 101, as illustrated.

DMR 101 is operable to conduct and stream a live multi-point video conference. The DMR 101 may combine data or recording from multiple input sources (e.g., computer 133, high definition camera 135, and document camera 137) into one multi-image recording that can be played on any remote device connected to network 103. The system presented in FIG. 1 may also be configured with a plurality of DMRs. Each DMR operable to capture and/or stream any live event and in addition, allow viewing of events captured on other DMRs, live or on demand. The present system is capable of supporting all industry standard file formats ensuring the broadest compatibility. In an illustrative example, a user may create a presentation (e.g., a Powerpoint presentation) on computer 133 in conjunction with a video or image recording from camera 135 and documents scanned using camera 137 to create a composite content for recording or storage on DMR 101.

The system illustrated in FIG. 1 offers the capability to enhance sales, marketing, and service of establishments including, but not limited to, fast food restaurants, car dealerships, or department stores. The DMR 101 may include an interface allowing users to create professional looking content. The DMR 101 can provide an optional launch program to help quickly develop marketing messaging, and training modules to get the system up and running quickly. Content created and recorded on DMR 101 may include content such as, employee orientation and training materials, marketing content, corporate messaging, new menu items for restaurants, sales promotions, customer discounts for durable and non-durable goods, and any other content suited for commercial purposes for retail and service stores. A subscription service (e.g., monthly) may be provided in certain embodiments to automatically refresh content on DMR 101 based on, for example, updated marketing content, promotions, messages, policies, etc. In an alternative embodiment, content may be created by third parties and uploaded to DMR 101 through a connection via network 103.

Network 103 may be any suitable type of network allowing transport of data communications across thereof. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections (e.g., Ethernet), wireless type connections (e.g., Wi-Fi), or any combination thereof. In one embodiment, network 103 may be a network following known Internet protocols for data communication. Communications and content transmitted to, from, and within DMR 101 may be encrypted using the Advanced Encryption Standard (AES) with a 256-bit key size, or any other encryption standard known in the art.

DMR 101 can be configured for scheduling of content distribution to DVPs at a plurality of remote retail stores such as DVP 105, 107, 109, and 111 at Store 1, Store 2, Store 3, and Store 4, respectively. In some embodiments scheduling of content distribution is performed by the DVPs. Store 1, 2, 3, and 4 may be any retail, service or point-of-sale locations such as fast food restaurants, car dealerships, or department stores. Using DMR 101, content may be automatically distributed from a main office or headquarters location to individual retail stores. The content on the DVPs at the retail locations may be updated daily with the latest content. Content may be created on DMR 101 and placed in drop directories that may be organized based on the type of content, locations, etc., which may subsequently be pulled from the DMR 101 by DVPs automatically.

DVPs may ping the DMR for new content to download and replace or delete content on the DVPs no longer needed or used. In another embodiment, a DMR includes a content scheduling feature that may be used to "push" content to the individual DVPs at certain times determined by the main office. DMR may include content access controls to manage access to the content in the drop directories from DVPs. Region-specific content such as local product offerings specific to certain retail locations can be placed in specific directories where only those specific retail stores can access that content, while general information such as orientation training materials may be available to all retail stores.

In one embodiment, certain types of content may be scheduled for delivery to DVP 105, 107, 109, and 111 based on certain hours of the day or events. For example, employee training materials may be distributed to the DVPs at the retail store locations anytime to allow for on-demand playback, while marketing and digital signage content may be distributed during store hours and corporate messaging may be distributed to the retail locations during off hours. DVPs 105, 107, 109 and 11 may automatically loop marketing content such as new product announcements, promotional specials, and advertisements on one or more store displays during regular business hours. When stores are closed, the DVPs may loop corporate messaging content celebrating a staff achievement or a new store opening and even delivering a message directly from a CEO. At any time, staff can play a training module, a safety seminar or even a recruitment video, on demand.

A DVP may serve to host the content delivered from DMR 101 in a local environment (e.g., a retail store). DMR 101 may also be used to upload and publish recorded content to websites, where DVPs may retrieve the content from the websites. Content delivered from DMR 101 may be stored on DVP 105, 107, 109, and 111 to provide on-demand playback to devices such as displays 113, 115, 117, and 119. Displays 113, 115, 117, and 119 may be store displays of digital signage players. In one embodiment, a DVP may be a small box mounted to the back of a store display. A person at a retail store location with a DVP may play these modules on an in store display (e.g., displays 113, 115, 117, and 119), or view them wirelessly with portable mobile devices such as, tablets 121, 127, laptops 123, 129, and portable media players 125, 131. For example, a chef working in a restaurant kitchen may access the restaurant's daily special dishes from a DVP using a Wi-Fi-enabled tablet computer and learn on how to prepare the dishes by streaming video content locally from the DVP to the tablet on-demand. Such a configuration allows individual retail chain to view content delivered from the DMR 101 repeatedly such that each retail store location would not need to establish multiple redundant connections to DMR 101 every time an employee requests access to digital media content. However, in an alternative embodiment, content may be accessed directly from DMR 101 by tablets 121, 127, laptops 123, 129, and portable media players 125, 131.

Any type of client device may used to access content from the DVPs (and in some embodiments, the DMR) including general purpose computing devices (e.g., personal computers, television set top boxes, terminals, personal digital assistants (PDA), cell phones, e-book readers, or any computing device having a central processing unit and memory unit capable of connecting to network 103). The client devices may also comprise a graphical user interface (GUI) or a browser application provided on a display (e.g., monitor screen, LCD or LED display, projector, touch-screen, etc.). A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages. A client device may also include or execute an application to communicate content, such as, for example, textual content, multimedia content, or the like. A client device may also include or execute an application to perform a variety of possible tasks, such as browsing, searching, playing various forms of content, including locally stored or streamed video. In some embodiments the client device may also report completion of training by one or more employees.

When streaming or receiving online training it may be necessary for the company to maintain access privileges and privacy rights. The system may determine whether a client device is recognized and is authorized to access the content. Users may be given specific access rights to the digital media content based on the user's level of access. For example, a user may access the content as a viewer, author, or administrator. Hierarchical user access control at the local store can be maintained in the local playback devices. The local playback device can also maintain access control of devices by using Ethernet MAC addresses or other unique identifiers so unregistered devices cannot access the content without permission.

DMR 101 is operable to automate the workflow of capturing, streaming, and distributing control based on a portable identification key. In certain embodiments, a portable identification key may be used to generate the content at the DMR and DVPs. The portable identification key may include metadata, such as a name of a user, location, title/position, and other individualized information with device-specific instructions used in the creating, streaming, distribution, management, and recording of digital media content. The portable identification key may be provided on credit card sized devices that store information about the user, group, or application. This card may determine the recording format, and where the captured content will reside, whether it gets streamed to an alternate location or uploaded to the organization's server. A user can insert such a card into the DMR or an interface communicatively coupled to a DMR. A recording may automatically begin as the card is inserted. When the card is removed, the recording may stop and perform one or more of the following: create a file in the format compatible with the user's computer and electronic devices, name the file appropriately to the user, tag the file with all the relevant information identifying the date, time, etc., upload the file to the user's personal media library, organization's server or determined location, and delete the file from the DMR to ensure user privacy and save storage space. Further description and details of the portable identification key are described in further detail in commonly owned U.S. patent application Ser. No. 13/654,399, entitled "CREATION AND MANAGEMENT OF DIGITAL CONTENT AND WORKFLOW AUTOMATION VIA A PORTABLE IDENTIFICATION KEY."

According to one embodiment, the portable identification key can be associated with an individual artist and/or be issued to that artist in a multiple performance environment such as a karaoke club, comedy club, or performing arts school (e.g., acting school, dance studio, martial arts studio, school of music, etc.). The portable identification key may contain a unique code such as a textual numeric sequence. Each time an artist performs, the portable identification key assigned to that artist can be read by DMR 101 to properly configure settings for and initiate a recording of that performance on DMR 101, such that the performances of each artist are stored in unique data directories, for example, within the recording DMR's internal storage medium. At some point in the future, a portable storage medium (such as a Universal Serial Bus (USB) drive, Digital Versatile Disk (DVD), etc.) may be inserted in DMR 101 and a portable identification key associated with an individual artist could be read by the DMR 101 to trigger the transfer of all of the recording files associated with that individual artist and previously recorded and stored in a discreet data directory associated with that specific portable identification key directly to the portable storage medium.

According to another embodiment, a portable identification key can be associated with, and/or issued for an individual, a workgroup and/or a specific application in an environment of multiple individuals, workgroups and/or applications. The portable identification key may contain metadata associated with applications for which it is assigned as well as instructions for configuring DMR 101, for naming, processing, storing and uploading recorded data files to remote servers, as well as the automation of any other workflow functions related to the management of the data files that the portable identification key is used to create. For example, a doctor could assign a portable identification key for each of their patients and use the portable identification key to automate a recording, processing, meta-tagging, and distribution of recordings for patient examinations or medical procedures. In one such exemplary application, DMRs may be used in counseling centers to record counseling sessions between psychologists and their patients. A wall plate can be installed in each counseling room that connects a USB jack to one or more DMRs. When a counseling session begins, the doctor plugs the portable identification key associated with the specific patient that they are counseling into the USB jack in the counseling room.

A session may automatically begin recording with insertion of the portable identification key. The recording initiates configuring the recording to record side by side images of two cameras, one on the doctor and one on the patient. When the counseling session is complete, the doctor removes the portable identification key from the wall plate and the DMR may stop recording and automatically perform the following:

1. Create a file in the file type(s) and format(s) compatible with computer or personal electronic.
2. Name the file(s) appropriately to an individual user.
3. Tag the file(s) with metadata identifying the author or the individual doctor, date, time, patient, and type of session, etc.
4. Upload the file(s) to the user's personal Media Library on a secure fileserver. The file may be processed and uploaded to a secure server where, for example, only the counselor and any supervising physician may have access to it.
5. Delete the file(s) from the DMR to protect user privacy (e.g. HIPPA compliance).

By eliminating the need for technical operators through the automation of the workflow, the doctor patient privacy is protected providing compliance with regulatory requirements. Given that the portable identification key is associated with the individual doctor and patient, it can be used in any counseling room within the center without compromising the security and proper management of the content.

Similarly, in another embodiment, a portable identification key can be associated with the manager of a given department of an organization, a workgroup within that department and a specific application such as a weekly meeting or training session. For example, a sales manager could use a portable identification key to record his or her weekly staff meetings, automatically name, process, meta-tag, and distribute the recordings of those meetings to the employees who attended those respective meetings or training sessions. Portable identification keys can be used in any type of organization to automate the workflow of creating, managing and distributing content. In another example, a credit card shaped USB drive associated with a portable identification key is assigned to each class that is held in a school in a given semester. The metadata on the portable identification key associates recorded files with the instructor, the department and the student body enrolled in a given class. The USB drive associated with a given portable identification key is inserted in a USB jack at the beginning of each class to initiate a recording. At the end of the class, the USB drive is removed stopping the recording and automatically naming, processing, meta-tagging and distributing the recordings of those classes or lectures to the students who attended the class as well as any appropriate department faculty.

According to another embodiment, a portable identification key can be utilized to capture audio, video, data and other communications in mobile applications to support various types of field operations. The portable identification key can be associated with, and/or issued for an individual, a branch of command and/or a specific operation in an environment of multiple individuals, branches of command and/or operations. The portable identification key can contain metadata associated with those specific operations for which it is assigned as well as instructions for configuring a DMR, for naming, processing, storing and uploading recorded data files to remote servers, as well as the automation of any other workflow functions related to the management of the data files that the portable identification key is used to create. For example, a credit card shaped USB drive may be used as a portable identification key to capture video communications, field reconnaissance and tactical sensor data on portable tactical command control centers comprising a DMR. In this application, a portable command center can be taken into the theater of operations and capture video communications from internal video conferencing codecs and cameras, external cameras and data sources, or external data from sensors deployed in the field. The portable identification key will initiate the capturing of such communication data, and automate the naming, processing and management of the created content including meta-tagging the content with tactical data (e.g., time, GPS coordinates, operative data, etc.), encrypting the files, securely uploading the files to a remote command location and deleting them from the memory of the portable command center so that sensitive intelligence cannot be captured in combat.

A portable identification key can be labeled to associate it with specific types of content, specific applications and/or specific regional or other geographic areas for the distribution of content. The portable identification key can contain metadata associated with applications for which it is assigned as well as instructions for configuring a DMR, for naming, processing, storing and uploading recorded data files to remote servers, as well as the automation of any other workflow functions related to the management of the data files that the portable identification key is used to create. A DVP may be placed in retail chain stores to deliver digital signage content, marketing and corporate messaging, as well as on-demand employee training modules. These unique types of content can vary with respect to regional distribution. For instance, a convenience store or fast food restaurant chain may have different product mixes for different national and international regions.

At a central location (e.g., headquarters) portable identification keys can be associated with each type of content (marketing, corporate messaging, training) as well as that content's respective distribution region. Portable identification keys may further be delineated for specific types of training. For example, a portable identification key being used by a restaurant chain could have a specific portable identification key for "Menu Training—Southwestern Region" or "Takeout Order Preparation—Midwest Region." The portable identification key can contain metadata associated with its specific content as well as instructions for configuring the DMR, for naming, processing and storing recorded data files in unique directories which delineate their content by type and region, as well as instructions for the automation of any other workflow functions related to the management of the data files that the portable identification key is used to create. Each night, the DVPs may log onto the DMR and compare the contents of each of their content type directories with their respective regionally delineated content type directories, and update their local directories to match. During store hours marketing content may automatically play on a customer facing display. Off hours corporate messaging content will automatically play on a customer facing display and/or employee facing display. At any time, these displays can be used to playback employee training modules on demand or training modules can be played on personal computing devices via a network connection to the DVPs.

According to another embodiment, a portable identification key can be used to identify an individual in order to automate the recording, file naming, processing, meta-tagging, uploading and distribution of audio, video and data content generated by or in the presence of that individual. For such applications a DMR could utilize personal identification cards already issued to employees of, or individuals associated with an organization such as identification cards utilizing magnetic card strips or Radio-Frequency Identification (RFID) technology. In one application, the portable identification key could be utilized to initiate and stop a recording through a reader connected to the DMR whereby the instructions for naming, processing, meta-tagging, uploading and distributing the recorded content would reside in a profile that resides on the DMR or on another computer or server accessible via a network to the DMR. This would allow individuals to create content and have it uploaded automatically to a secure location where only that individual has access to it.

In another application wherein the portable identification key could be read from some distance such as an identification card which incorporates an RFID tag, recordings could initiate and stop automatically when an individual enters or exits a given room. A portable identification key can be used to identify an individual in order to automate a process such as video switching based on the presence or location of that individual at any given time. For such applications a video switching system (or device) could utilize personal identification cards already issued to employees of, or individuals associated with an organization as long as those identification cards could be read at some distance such as identification cards incorporating RFID technology. One such application could monitor the location of an individual through a facility that had a network of video cameras throughout it. The system could locate an individual or track that individual through an automated camera switching system as the individual moves throughout the facility. This automated switching system could additionally be integrated to a DMR allowing one to track and record an individual's movements throughout a facility for later review. Such a system could have several applications including security, employee monitoring, or clinical applications.

According to yet another embodiment, a portable identification key can be associated with a specific process for automating a given application's workflow. In one example, a portable identification key could be associated with automating several processes associated with the emergency evacuation of a plant. Announcements, switching of camera video to security monitors, displaying of emergency evacuation routes on display systems, alerting of emergency response services and any other workflow functions could be automated based on reading a specific portable identification key.

DMR 101 may also include features for tracking the usage of the distributed content at each DVP. Consumers of content accessed from a DVP may be identified, associated with an identification of the accessed content, and recorded. For example, an employee may be required to complete certain training courses where their progress and completion of the courses may be recorded at the DVP and sent to DMR for reporting. DMR 101 is capable of automatically providing reports of which training modules have been accessed or taken and how frequently they were taken at each DVP or location associated with the DVP's. That way, the main office or headquarters can determine who has accessed their content, how many contents, and which of their contents were accessed. Usage reporting is described in further detail with respect to the description of FIGS. 3 and 4.

Figure 2:
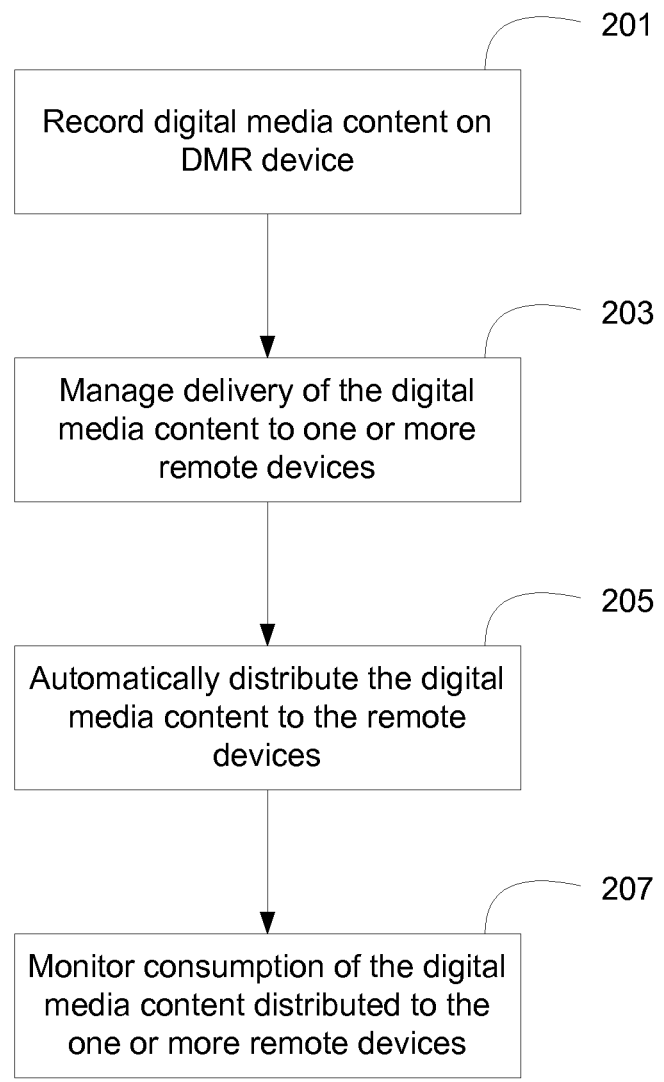
FIG. 2 illustrates a flowchart of a method for automating content delivery according to an embodiment of the present invention.

FIG. 2 illustrates a flowchart of a method for automating content delivery according to an embodiment of the present invention. Digital media content is recorded on a DMR device, step 201. The digital media content may be created, received, recorded, stored, and/or generated on the DMR device or alternatively, uploaded to the device. Digital media content may comprise images, videos, and audio related to advertisements, sales promotions, sales and marketing content, modules, presentations, employee orientation and training materials, corporate messages, signage content, and any other information used at retail/service locations. The DMR device may be used at corporate locations to distribute content to their many point-of-sale locations.

Delivery of the digital media content to one or more remote devices is managed, step 203. Upon creation and recording of the digital media content, the digital media content may be organized into drop directories and distributed to devices at, for example, retail locations. Recording of the digital media content may be scheduled as well as played back. The method further includes automatically distributing the content to the one or more remote devices, step 205. The content may be distributed when a determination that new content is available for download to the one or more remote devices at retail stores. DVP devices at the one or more retail stores may make the determination by polling DMR devices at the corporate locations to automatically update and refresh content at the retail store locations. DVP devices may be configured for polling on an interval such as hourly, daily, monthly, or annual basis. The DVP devices may download the content and host the content locally where client devices may connect to the DVP via a wireless connection such as Wi-Fi, to stream the content to the client devices.

In step 207, consumption of the digital media content distributed to the one or more remote devices is monitored. The DMR devices may include a usage reporting feature that provides usage data of content for the one or more remote devices at the retail stores. A usage report may list the titles of the distributed content, locations of the one or more retail stores, and a count of the usage of the distributed content at each of the retail stores both cumulatively and by individual user.

Figure 3:
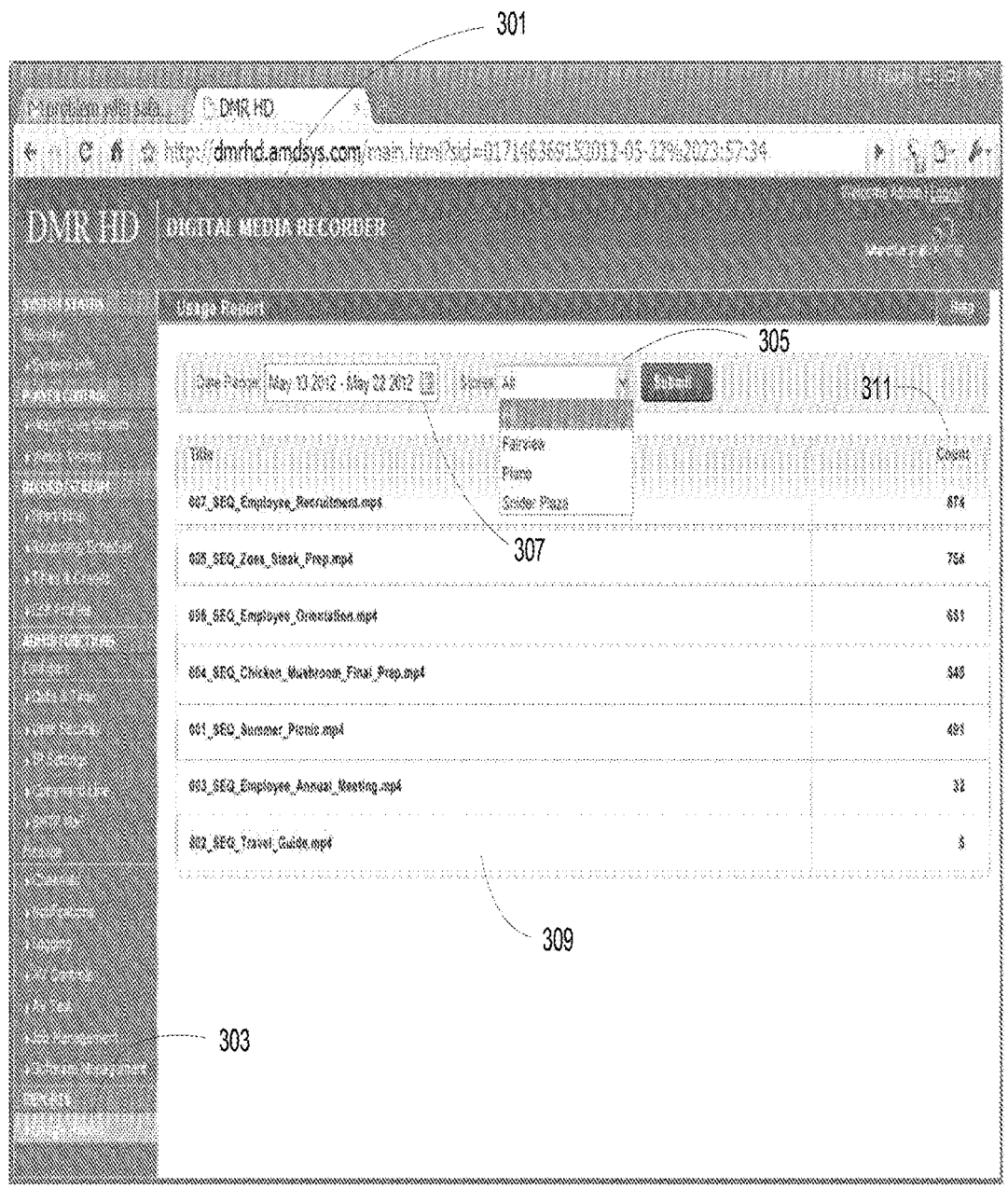
FIGS. 3 and 4 illustrate exemplary screenshots for monitoring consumption of distributed content according to an embodiment of the present invention.

FIG. 3 illustrates an exemplary screenshot for monitoring consumption of distributed content according to an embodiment of the present invention. An interface 301 to a DMR device may be accessed by users with sufficient access rights such as an administrator. Interface 301 provides various management tools including a usage report feature 303. The illustrated usage report provides a count 311 for a list of titles 309 for digital media content recorded on the DMR device. Count 411 may indicate the number of times a given content from the list of titles 309 have been accessed. The list of titles may include video demonstrations, training, messages, etc. A list of store locations 305 and a date range 307 may be selected as filtering criteria for presenting the usage information. For example, title and count information for a selected location may be displayed for a selected date range.

Figure 4:
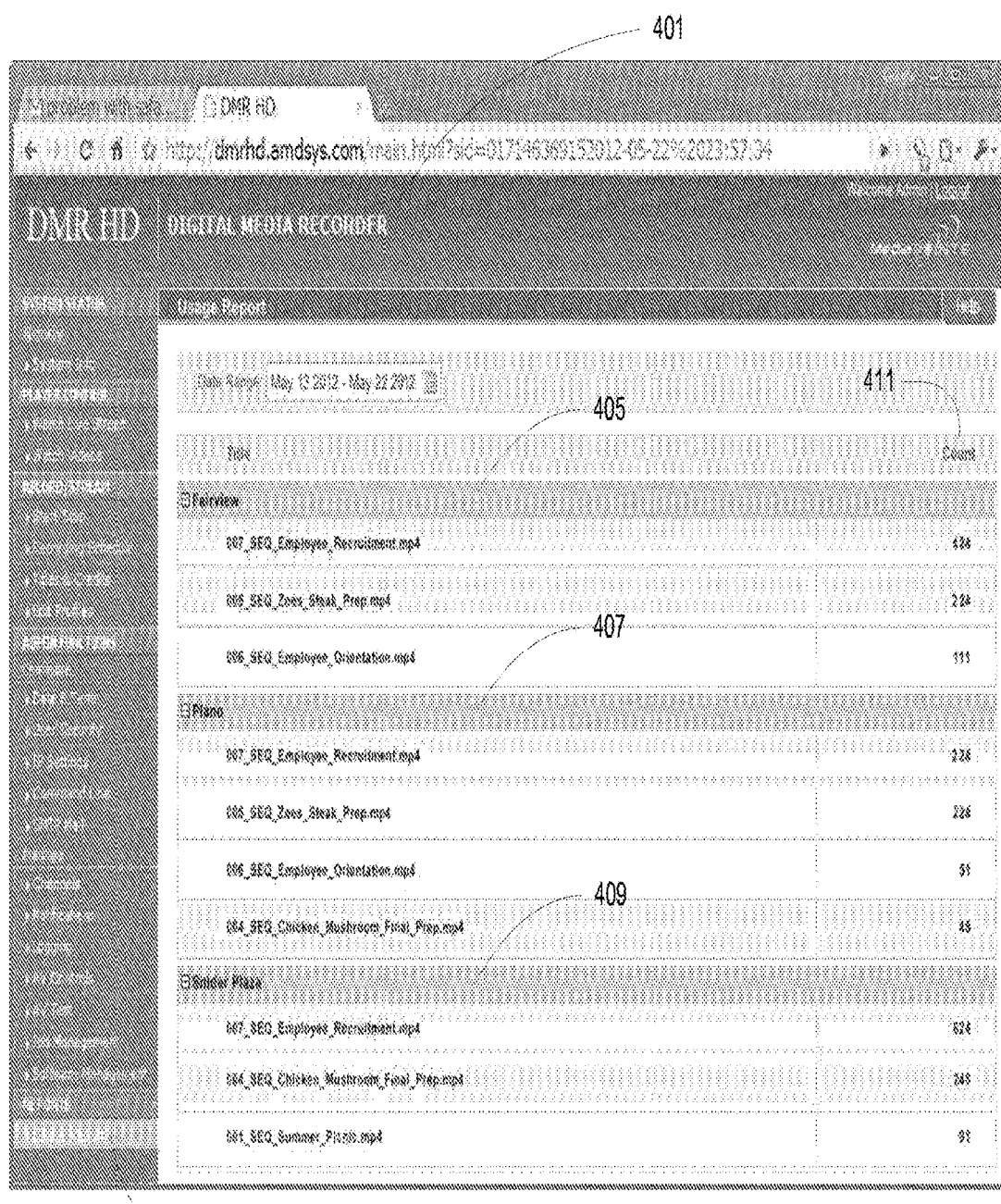

FIG. 4 illustrates another exemplary screenshot for monitoring consumption of distributed content according to an embodiment of the present invention. The usage report 403 provided in DMR interface 401, as illustrated, is listed according to store locations 405, 407, and 409. Under each store location, the available titles and their associated counts are listed. As illustrated, specific content titles and their respective counts 411 are listed in a store-to-store comparison view for the Fairview location 405, Plano location 407, and Snider Plaza location 409.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for providing on-site content delivery and on-demand content access, the method comprising:
   loading, to a digital media recorder (DMR) device, parameters from a reader device that were received from a wireless portable identification key device upon verifying authorization of a user in possession of the key device to access the DMR device, the parameters defining location-specific configurations to operate a plurality of recording devices by a specific user using the wireless portable identification key device, wherein the plurality of recording devices that receive the parameters are determined to be located at different locations;
   recording digital media content on the DMR device by combining media content received from the plurality of recording devices in conjunction with automated operation of ancillary equipment according to the parameters and a location of the specific user corresponding to one of the different locations, wherein the ancillary equipment includes one or more of the following: lights, projectors and switching systems;
   starting and stopping the recording of the digital media content based on the wireless portable identification key device entering or exiting a given location that is detectable by the reader device;
   managing distribution of the digital media content to one or more remote devices;
   automatically distributing the digital media content to the one or more remote devices; and
   monitoring consumption of the digital media content distributed to the one or remote devices.

2. The method of claim 1 further comprising receiving polling requests from the one or more remote devices to refresh the distributed digital media content.

3. The method of claim 1 wherein the wireless portable identification key device includes predefined instructions to create, tag, and distribute the digital media content.

4. The method of claim 1 wherein managing distribution of the digital media content to the one or more remote devices is based on a configuration associated with the wireless portable identification key device.

5. The method of claim 1 wherein automatically distributing the digital media content to the one or more remote devices is based on a configuration associated with the wireless portable identification key device.

6. A system for on-site content delivery and on-demand content access, the system comprising:
   a digital media recorder (DMR) device;
   a reader device coupled to the DMR device, the reader device receives parameters from a wireless portable identification key device upon verifying authorization of a user in possession of the key device to access the DMR device and loads the parameters to the DMR device, wherein the parameters define location-specific configurations to operate a plurality of recording devices by a specific user using the wireless portable identification key device, and the plurality of recording devices that receive the parameters are determined to be located at different locations;

a processor; and a memory having executable instructions stored thereon that when executed by the processor cause the processor to:

record digital media content on the DMR device by combining media content received from the plurality of recording devices in conjunction with automated operation of ancillary equipment according to the parameters and a location of the specific user corresponding to one of the different locations, wherein the ancillary equipment includes one or more of the following: lights, projectors and switching systems;

start and stop the recording of the digital media content based on the wireless portable identification key device entering or exiting a given location that is detectable by the reader device;

manage distribution of the digital media content to one or more remote devices;

automatically distribute the digital media content to the one or more remote devices; and monitor consumption of the digital media content distributed to the one or remote devices.

7. The system of claim 6 wherein the processor is configured to receive polling requests from the one or more remote devices to refresh the distributed digital media content.

8. The system of claim 6 wherein the portable identification key device includes predefined instructions to create, tag, and distribute the digital media content.

9. The system of claim 6, wherein the processor manages distribution of the digital media content to the one or more remote devices based on a configuration associated with the wireless portable identification key device.

10. The system of claim 6 wherein the processor automatically distributes the digital media content to the one or more remote devices based on a configuration associated with the wireless portable identification key device.

11. The method of claim 1 wherein the digital media content includes content generated by or in the presence of the specific user.

12. The system of claim 6 wherein the digital media content includes content generated by or in the presence of the specific user.

13. The method of claim 1 further comprising identifying the location of the specific user based on a location corresponding to the parameters received from the wireless portable identification key device by the reader device.

14. The method of claim 13 further comprising monitoring the location of the specific user.

15. The system of claim 6 wherein the processor identifies the location of the specific user based on a location corresponding to the parameters received from the wireless portable identification key device by the reader device.

16. The system of claim 15 wherein the processor monitors the location of the specific user.

* * * * *